United States Patent [19]

Corcoran, Jr. et al.

[11] Patent Number: 5,110,571
[45] Date of Patent: May 5, 1992

[54] STANNOSILICATES AND PREPARATION THEREOF (C-2417)

[75] Inventors: Edward W. Corcoran, Jr., Easton, Pa.; David E. W. Vaughan, Flemington, N.J.; Paul E. Eberly, Jr., Baton Rouge, La.

[73] Assignee: Exxon Research and Engineering Company, Florham Park, N.J.

[21] Appl. No.: 486,471

[22] Filed: Feb. 28, 1990

Related U.S. Application Data

[63] Continuation-in-part of Ser. No. 91,657, Sep. 1, 1987, abandoned.

[51] Int. Cl.$^5$ ............................................. C01B 33/20
[52] U.S. Cl. .................................. 423/326; 423/328; 502/77
[58] Field of Search ............... 423/326, 328, 329, 330; 502/85, 77

[56] References Cited

U.S. PATENT DOCUMENTS

| RE. 29,948 | 3/1979 | Dwyer et al. | 423/326 |
| 4,329,328 | 5/1982 | McAnespie | 423/333 |
| 4,427,787 | 1/1984 | Migle et al. | 423/328 |
| 4,806,512 | 2/1989 | Elvin | 502/86 |

OTHER PUBLICATIONS

Riegel, E. R. "Industrial Chemistry" Reinhold Publ. Corp. NY 5th Ed. 1949 p. 251.

Primary Examiner—R. Bruce Breneman
Attorney, Agent, or Firm—Jay Simon

[57] ABSTRACT

Highly crystalline stannosilicates are formed by reacting a tin salt with a source of silica and a hydroxide of a Group IA or Group IIA metal or an amine.

17 Claims, 5 Drawing Sheets

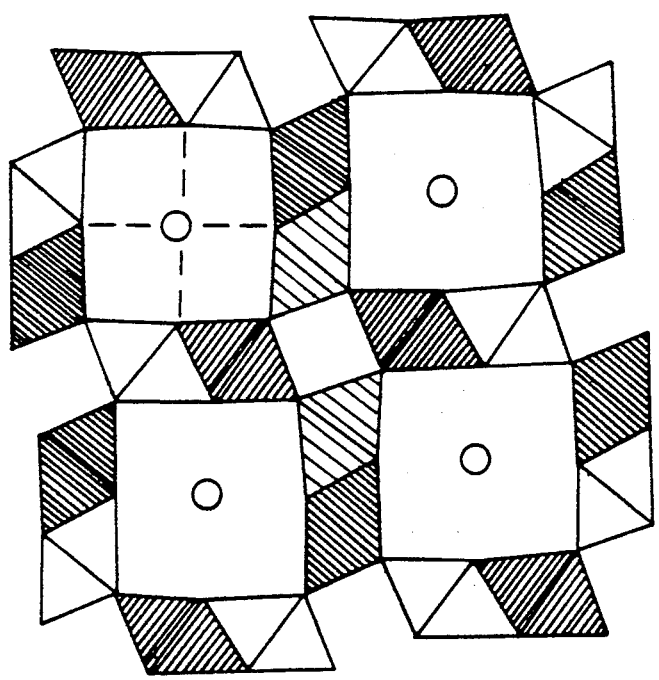
FIG. IC
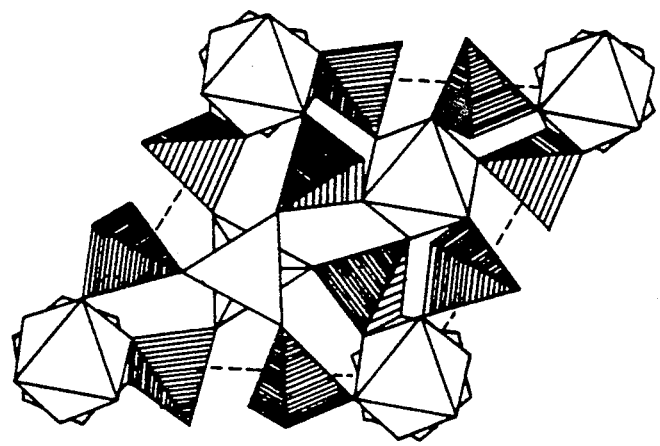
FIG. ID

STANNOSILICATES AND PREPARATION THEREOF (C-2417)

CROSS REFERENCE TO RELATED APPLICATIONS

This application is a continuation-in-part of U.S. Ser. No. 091,657, filed Sept. 1, 1987, now abandoned.

FIELD OF THE INVENTION

This invention relates to novel class of highly crystalline stannosilicate materials, in which silicon is in tetrahedral coordination and tin is in five or six fold coordination, and the preparation thereof. These novel materials are useful as catalysts, catalyst supports, sorbents, e.g., for the separation of hydrogen sulfides from gas streams containing hydrogen contaminated with hydrogen sulfides or oxysulfides.

BACKGROUND OF THE INVENTION

The extensive research and development into alumino-silicates has been highly successful and studies have turned to other materials that might lead to similar types of structures.

There are numerous classes of microporous silicates of interest in sorption, catalysis, and ion exchange, in which silicon is tetrahedrally coordinated through oxygen to numerous other metals in either tetrahedral or octahedral coordination. Primary amongst the former are the zeolites (see Barrer, "Hydrothermal Chemistry of Zeolites", Academic Press (1982) for a review), and amongst the latter, the clays (see Brown and Brindley, Clays and Clay Minerals, Min. Soc. (London), (1978), for a review). Whereas the zeolites are characterized by three dimensional covalent bonding the clays comprise sheets covalently bonded within the sheet and weakly ionically bonded between the sheets. In some cases, when the sheets are electrostatically neutral, as in talc or kaolin, the sheets are held together by weak van der Waals forces. Other classes of similar structures include the sheet like silicic acid materials (e.g., Legally, Adv. Colloid and Interface Sc., Vol. II, p. 105 (1979)) and the many sheet materials rendered three dimensional by various pillaring reactions (see Vaughan, Amer. Chem. Soc. Symp. Ser. 368, p. 308 (1988) for a review).

Within each of these major families of materials are many subgroups. The three dimensional tetrahedrally coordinated structures now include a large number of metallo-phosphates (see Wilson, Flanigen et al, Amer. Chem. Soc. Symp. 398, p. 329 (1989); Proc. 7th Intl. Zeol. Conf., Elsevier Press (Tokyo), p. 103 (1986), for recent reviews), silicas and various modified silicas. The latter two include clathrasils (various $SiO_2$ analogues of the ice clathrates) and zeosils ($SiO_2$ analogues of various zeolite structures). This terminology has been reviewed by Liebau et al, Zeolites, Vol. 6, p. 373 (1986). Much recent work has focused on many metal modifications of the zeosils. An unusual and unexpected characteristic of these materials is a high concentration of "internal" hydroxyl groups (Woolery et al, Zeolites, Vol. 6, p. 14 (1986)) which seem to readily react with numerous metal cations (U.S. Pat. No. 4,576,805; Eur. Pat. Appl. 0134,849; UK Pat. Appl. GB 2,024,790A). However, the metal content of such materials is usually less than about 1 to 2% wt. Various other methods of metal substitution into conventional zeolites could be envisioned by manipulating established methods of dealumination, such as high temperature gas phase reactions (Fejes et al, React. Kinet. Catal. Letters, Vol. 14, p. 481 (1980); Beyer et al, Stud. Surf. Sci. Catal; Vol. 5, p. 203 (1980), Elsevier Press), aqueous ammonium metal fluoride treatments (Breck and Skeels, Proc. 6th Intl. Zeol. Conf., p. 87 (1984), Butterworths), or non-aqueous solvent "exchange" treatments (Intl. Pat. WO 88/01254), and substitutions under hydrothermal conditions. Whilst all of these methods may involve tin substitution into zeolite or zeolite like tetrahedral frameworks, they are distinctly different products from those of the instant invention, both in structure and composition (i.e., the level of tin included in the structure).

The many ways of coordinating or interlinking tetrahedra, octahedra or a combination of the two have been considered by several authors (e.g., A.F. Wells, "Structural Inorganic Chemistry", 5th Ed., Oxford Univ. Press, Ch. 5 (1984)). Although there are many thousands of possible structures in a strictly mathematical sense, the reality is that only a relatively small number of them exist in nature or can be synthesized in the laboratory. Four different general examples of such structures are shown in FIG. 1. The instant invention is concerned with materials in which silicon is in tetrahedral coordination and tin is in octahedral coordination, said materials having unique and definitive structures as identified by their characteristic x-ray diffraction patterns.

Oxide and mixed oxide crystalline structures with tin are well known in the literature, and in these cases all metals are octahedrally coordinated. Examples of these include $SnO_2$ itself (cassiterite), $Li_8SnO_6$ (Tromel, Zeit. Anorg. Allg. Chem., v. 368, p. 248 (1969)) and $Li_2SnO_3$ (Lang, ibid, v. 348, p. 246 (1966)) in addition to numerous temarz tin oxides (Clayden et al, J. Chem. Soc. Dalton, p. 843 (1989)) and rare earth stannates (Grey et al, J. Amer. Chem. Soc., v. III, p. 505 (1989)). In other materials tin is octahedral and other metals are tetrahedral, as in the minerals:

Eaherite A. A. Kossiahoff Am. Miner. 1976, v. 61, p. 956.
Mizerite I. E. Grey Am. Miner. 1979, v. 64, p. 1255.
Malayaite J. B. Higgins Am. Miner. 1977, v. 62, p. 801.
Stohesite A. Vorma Miner. Mag. 1963, v. 33, p. 615.
Sorensenite J. M. - Johansen Acter Chyst. 1976, V. B32, p. 2553.

Similar synthetic materials of this type are extensive (e.g.)

V. N. Rudenko et al, Mineral. Zh. 1983, 5, 70.
F. K. Larsen et al, Acta Chem. Scand. 1967, 21, 1281.
N. V. Zayakina et al, Dokl. Akad. Nauk SSSR 1980, 254, 353.
A. N. Safronov et al, Dokl. Akad. Nauk SSSR 1980, 255, 1114.
A. N. Safronov et al, Dokl. Akad. Nauk SSSR 1983, 269, 850.
I. V. Rozhdestvenskaya et al, Mineral. Zh. 1985, 7, 78.
V. V. Gorokhovskii et al, Izv. Akad. Nauk SSSR, Neorg. Mater. 1971, 7, 2033.
I. Y. Nekrasov, Dokl, Akad. Nauk SSSR 1973, 212, 705.
I. V. Nekrasov et al, Dokl. AKad. Nauk SSSR 1977, 232, 909.
I. A. Nekrasov et al, Fiz.-Khim. Petrol. 1978, 8, 193.
I. Y. Nekrasov et al, Dokl. Akad. Nauk SSSR 1978, 243, 1286.
I. Y. Nekrasov et al, Dokl. Akad. Nauk SSSR 1981, 261, 479.
G. T. Desai and D. R. Baxi, Indian J. Tech. 1978, 16, 201.

A. N. Christiansen, Acta. Chem. Scand., 24, p. 1287 (1970).

However, in none of these cases are the materials of this invention reported, nor would one expect to make them using the methods of synthesis used by those researchers.

In addition to the crystalline materials detailed above are many amorphous or gel materials made by cogellation of a stannate with a silicate. In some cases these comprise true gels, but in other cases they comprise tin hydroxide precipitated in a matrix of silica gel. Numerous of these have been evaluated as ion exchangers (e.g., U.S. Pat. No. 4,329,328) and catalysts (Tanabe, "Solid acids and bases", p. 71, Kodansha Press (1970)).

SUMMARY OF THE INVENTION

Novel, highly crystalline stannosilicates having the generic formula:

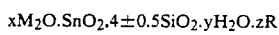

$$xM_2O \cdot SnO_2 \cdot 4 \pm 0.5 SiO_2 \cdot yH_2O \cdot zR$$

wherein M may be any Group IA or, where $M_2O$ becomes MO, Group IIA metal, or a quaternary amine, e.g., tetraethylamine.

x is 1.5 to 4
y is 4 to 15
R is an amine
z is 0 to 4

Silicon is tetrahedrally coordinated through oxygen and tin is octahedrally coordinated through oxygen and hydroxyl groups to form three dimensional framework structures within which the cations and alkylammonium molecules are located. The ion-exchange properties of these materials, and their properties of reversibly sorbing water and other polar molecules, confirms their microporous nature in contrast to the non-sorbing dense structures of the prior art.

Thus, the stannosilicates of this invention contain a backbone or framework comprising tin, silicon, and oxygen in which the tin is octahedrally coordinated. The ratio of tin to silicon in the framework is about 1:3.5 to about 1:4.5 and the tin is not exchangeable and essentially all of the time is in the framework.

They are prepared by reacting a base, that is, a Group IA or Group IIA metal (e.g., sodium, potassium cesium, rubidium, magnesium, calcium, strontium) hydroxide or mixtures thereof or quaternary amine with a water soluble tin salt, e.g., chlorides, nitrates, sulfates or salts derived from dissolving tin oxide in an acid or base, and silica or a source of silica in an aqueous medium at conditions leading to the formation of these novel crystalline materials.

DESCRIPTION OF THE DRAWINGS

FIG. 1 shows four different kinds of structures comprising linked oxygen tetrahedra, octahedra or mixtures of both of these. In addition to corner sharing, edge and face shared octahedra are also common in natural and synthetic materials.

FIG. 1(c) is made up of edge and face shared octahedra, in this case characteristic of the mineral hollandite and the synthetic form $\alpha$-$MnO_2$, and typical of numerous oxides of W, Mn, Ti and Nb (see for a review, Wadsley, "Nonstoichiometric Compounds", Ed. L. Mandelcorn, Academic Press (London), p. 99 (1964)).

FIG. 1(d) comprises a three dimensional structure of $Si_5P_6O_{25}$ (Mayer, Monatsh. Chem., 105, p. 46 (1974)) comprising Si and P tetrahedral linked to Si octahedra.

DESCRIPTION OF THE INVENTION

Figure 1A:
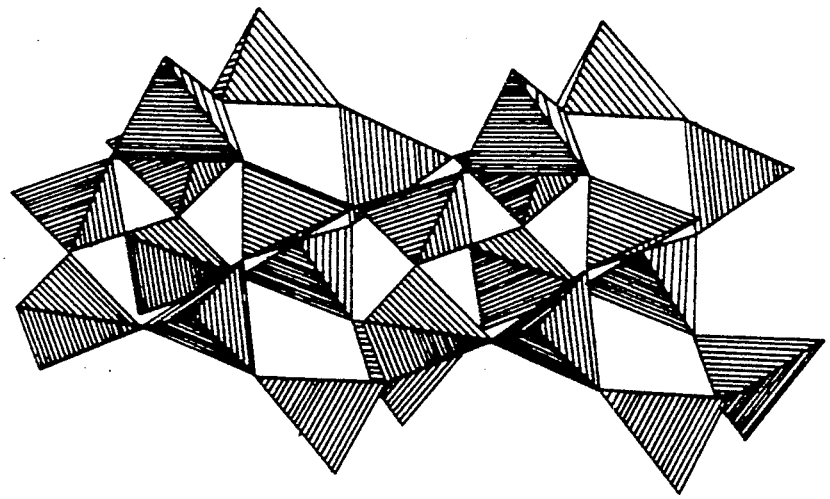
FIG. 1(a) is the chain of corner shared tetrahedra found in the zeolite mineral mordenite (Meier, "Molecular Sieves", Ed. R. M. Barrer, Soc. Chem. Ind. (London), p. 41 (1968)).
Figure 1B:
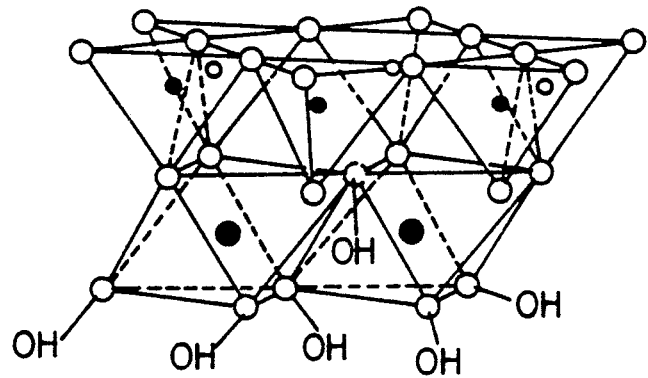
FIG. 1(b) is an illustration of sheets of corner shared tetrahedral linked to corner and edge shared octahedra in the mineral kaolinite, a linkage typical of all the clay minerals.

Of the metal salts reacted with silica and the tin salt, the alkali metals: lithium, sodium, potassium, rubidium and cesium and mixtures thereof are preferred. Particularly preferred are sodium and potassium or mixtures thereof. In a preferred embodiment, the novel stannosilicates are formed using a mixed cation preparation, that is, lithium and sodium hydroxides, sodium and cesium hydroxides. Generally, mixtures provide stannosilicates of enhanced purity over preparations using only one alkali salt.

The reaction generally occurs under autogenous pressure at temperatures above about 90° C. and below about 250° C., preferably 150°–225° C. The ratio of tin to silicon is no greater than about 1:20 and preferably about 1:4 to about 1:20.

The reactants generally combine to form a gel-like substance and crystallization occurs at reaction temperatures for a period of a few days to several weeks, e.g., seven days to eight weeks. After the appropriate time period, the reaction is quenched, the crystalline powder is recovered by, for example, filtration, and thoroughly washed and dried. Drying can be accomplished by an overnight heating at about 100° C. Impurities can be removed by an acid treatment, e.g., 1N HCl.

Often, it is preferred to age the reaction mixture at ambient conditions, i.e., below about 50° C. for at least about 3 hours, preferably at least about 24 hours, to allow nucleation. Alternatively, nucleation can be effected by adding a nucleating compound such as a finely divided oxide, e.g., alumina, or a nucleation solution as used in zeolite synthesis and reported in U.S. Pat. Nos. 3,808,326 and 4,178,352. Up to about 10 vol% nucleating compound can be employed.

Thermal dehydration at, for example, 300° C. will drive off water and the x-ray diffraction pattern will change slightly to show a contraction of the lattice, or movement of cations, or both. In adsorbent or catalytic processes the stannosilicate is usually dried or calcined to remove pore filling water cations or amine and in the generic formula shown above, y or z or both may then be zero.

The following examples will further illustrate this invention.

Reactant grade stannous chloride pentahydrate and anhydrous stannic chloride were used without further purification. Colloidal silica (Ludox HS-40) was obtained from DuPont and fumed silica (Cabosil) was obtained from Cabot Corp. All reactions were carried out hydrothermally in 75 ml stainless steel autoclaves under autogenous pressures. Powder x-ray diffraction measurements were conducted on a Siemens D500 powder diffractometer using a Siemens DIFFRAC-5 data system.

Reactants were thoroughly mixed at room temperature according to the ratio 2–8 $M_2O:SnO_2:4$–20 $SiO_2$:80–180 $H_2O$ where M=$NH_4$, Na, K, Cs, Li, Rb, or alkyl ($C_1$–$C_4$) quaternary ammonium mixtures of two or more cations. The resulting gel was then reacted at a temperature between 150° C. and 250° C. for period lasting between one week and two months. At the end of this time the autoclave was cooled to room temperature and the solid product separated by filtration. The crystalline powder was then washed repeatedly with water and dried at 100° C. The following are representatives of typical syntheses in the sodium stannosilicate system. The phases are identified by their unique x-ray diffraction patterns (Tables 1–7) and NMR spectra (Table 9).

EXAMPLE 1

Figure 2:
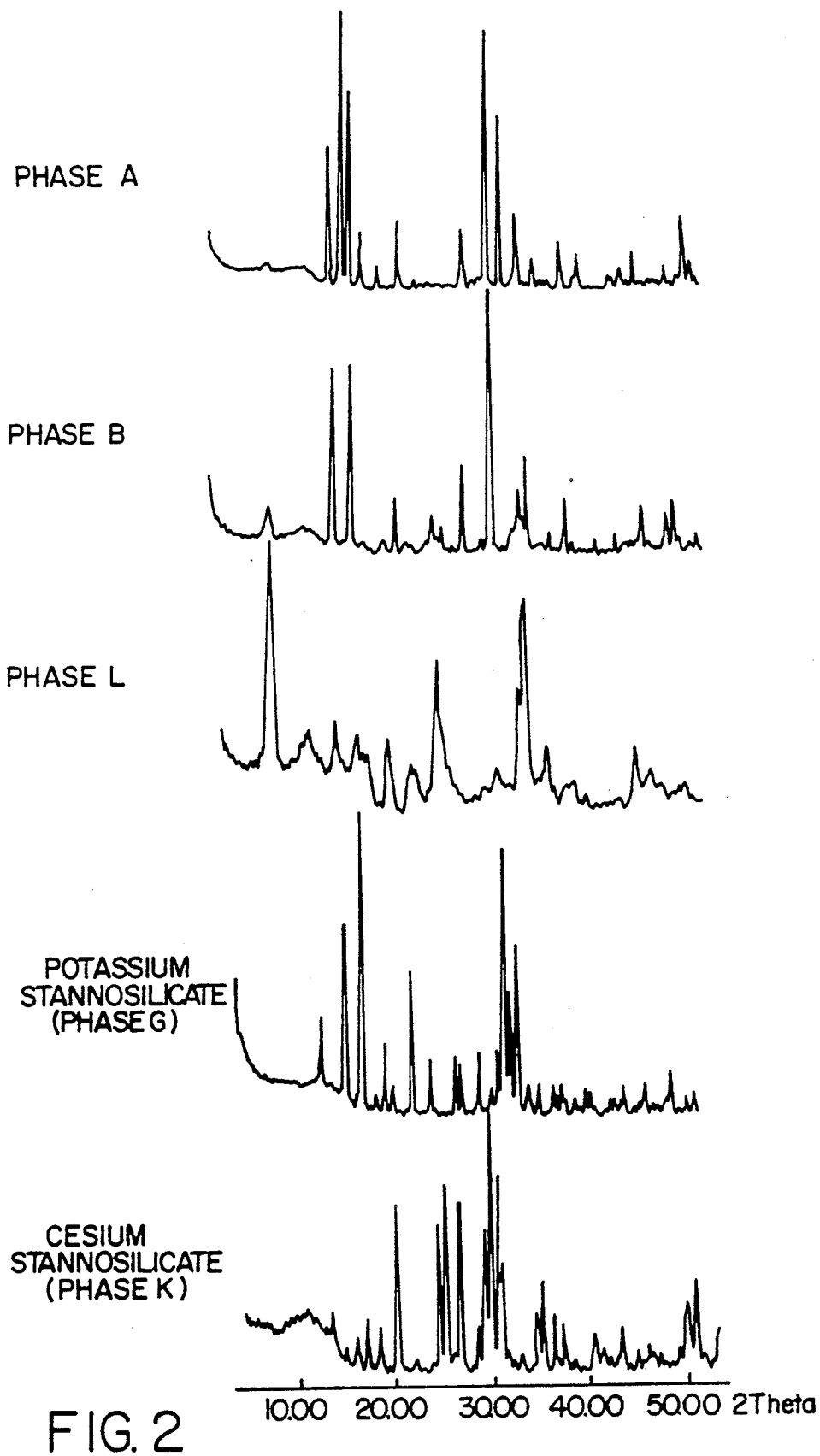
FIG. 2 comprises x-ray diffraction patterns (Cu $K_d$ radiation) for the novel stannosilicate phases A, B, L, G and K of this invention.

The sodium stannosilicate (phase A) was prepared as follows: A 14.9 g quantity of sodium hydroxide was dissolved in 20.0 g distilled water and added slowly, with mixing, to 27.4 g HS-40 (40% colloidal silica in water). A second solution was prepared by dissolving 16.0 g of stannous chloride pentahydrate in 20.0 g distilled water. The two solutions were combined slowly, thoroughly mixed, and distilled water added to make a total weight of 100 g. This corresponded to a reaction ratio of $1Na_2O:SnO_2:4SiO_2:80H_2O$. The gel was divided between four 75 ml autoclaves which were sealed and kept at 200° C. for 24 days. At the end of this period the reaction vessels were quenched, while solid was removed by filtration, washed repeatedly with water, and dried at 100° C. overnight. Powder x-ray diffraction indicated that a single, highly crystalline phase was produced as shown in Table 1 and FIG. 2. Thermal dehydration of this compound at 300° C. resulted in a phase which exhibited a somewhat different powder pattern by x-ray analysis indicative of a unit cell shrinkage caused by loss of water, hydroxyl groups and cation movement.

Minor impurities which sometimes occurred in this material were removed by stirring in 1N HCl for two hours at room temperature followed by filtration and repeated washing with water. This resulted in slightly sharper lines in the x-ray powder pattern with little or no loss of crystallinity.

TABLE 1

| X-Ray Diffraction Pattern For Phase A | |
|---|---|
| dÅ | I/Io |
| 6.63 ± 0.15 | 29 |
| 5.83 ± 0.15 | 100 |
| 5.56 ± 0.15 | 42 |
| 5.19 ± 0.10 | 12 |
| 4.73 ± 0.10 | 8 |
| 4.28 ± 0.10 | 18 |
| 3.30 ± 0.08 | 23 |
| 3.05 ± 0.08 | 73 |
| 2.91 ± 0.05 | 69 |
| 2.77 ± 0.05 | 27 |
| 2.64 ± 0.05 | 11 |
| 2.45 ± 0.05 | 15 |

TABLE 1-continued

| X-Ray Diffraction Pattern For Phase A | |
|---|---|
| dÅ | I/Io |
| 2.35 ± 0.05 | 9 |

EXAMPLE 2

Figure 4:
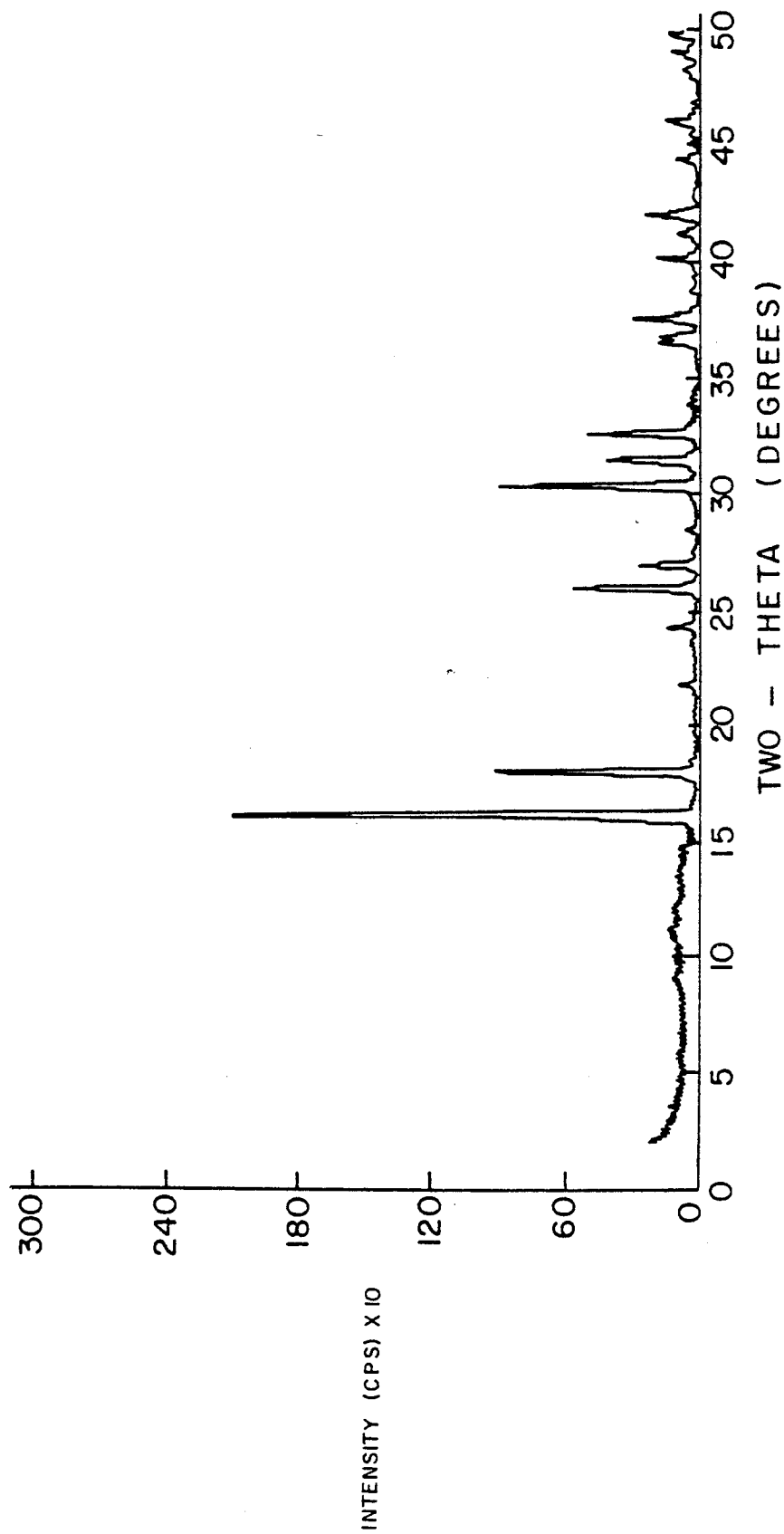
FIG. 4 is the x-ray diffraction spectrum for phase A.

A sample of phase A, synthesized as described in Example 1, was heated in an air oven at 900° C. for 2 hours. The final product, here designated phase X, was distinctly different from phase A, as shown by its characteristic x-ray diffraction pattern shown in Table 2 and FIG. 4.

TABLE 2

| X-Ray Diffraction Pattern Characteristic of Phase X | |
|---|---|
| dÅ | I/Io |
| 5.50 ± 0.10 | 100 |
| 4.93 ± 0.10 | 44 |
| 4.09 ± 0.10 | 5 |
| 3.67 ± 0.08 | 5 |
| 3.43 ± 0.08 | 27 |
| 3.31 ± 0.08 | 11 |
| 2.94 ± 0.05 | 47 |
| 2.84 ± 0.05 | 24 |
| 2.75 ± 0.05 | 24 |
| 2.46 ± 0.05 | 10 |
| 2.40 ± 0.05 | 15 |
| 2.25 ± 0.05 | 11 |
| 2.19 ± 0.05 | 7 |
| 2.15 ± 0.05 | 17 |
| 2.04 ± 0.05 | 6 |
| 1.97 ± 0.05 | 12 |
| 1.86 ± 0.05 | 9 |
| 1.83 ± 0.05 | 7 |

EXAMPLE 3

Sodium Stannosilicate (phase B). Sodium hydroxide (14.9 g) was dissolved in 25.0 g distilled water and 11.0 g of fumed silica was added. Separately, 16.0 g stannous chloride pentahydrate was dissolved in 25.0 g distilled water. The two solutions were combined, water added to make 100 g total weight, and the gel mixed thoroughly. This corresponded to the reaction ratio in the preceding examples, $2Na_2O:SnO_2:4SiO_2:80H_2O$. Crystallization at 200° C. for 17 days followed by workup as previously described yielded a crystalline structurally unique phase, as shown by the x-ray diffraction pattern in Table 3 and FIG. 2.

TABLE 3

| X-Ray Diffraction Pattern For Phase B | |
|---|---|
| dÅ | I/Io |
| 6.25 ± 0.15 | 74 |
| 5.59 ± 0.15 | 70 |
| 4.41 ± 0.10 | 22 |
| 3.76 ± 0.08 | 13 |
| 3.60 ± 0.08 | 8 |
| 3.33 ± 0.08 | 26 |
| 3.11 ± 0.08 | 6 |
| 3.02 ± 0.08 | 100 |
| 2.72 ± 0.05 | 40 |
| 2.54 ± 0.05 | 10 |
| 2.44 ± 0.05 | 19 |
| 2.40 ± 0.05 | 5 |
| 2.28 ± 0.05 | 6 |
| 2.17 ± 0.05 | 8 |
| 2.05 ± 0.05 | 21 |
| 1.95 ± 0.05 | 19 |
| 1.92 ± 0.05 | 17 |
| 1.90 ± 0.05 | 7 |

TABLE 3-continued

| X-Ray Diffraction Pattern For Phase B | |
|---|---|
| dÅ | I/Io |
| 1.84 ± 0.05 | 12 |

This phase can also be synthesized in a higher purity form using a mixture of two cations with the reaction ratio of $Na_2O:Li_2O:SnO_2:4SiO_2:80H_2O$. The reactants were mixed, as above, and the gel reacted at 200° C. for 16 days yielding phase B.

EXAMPLE 4

Sodium stannosilicate (phase L). A 21.1 g sample of sodium hydroxide was dissolved in 10.0 g distilled water; 12.8 g stannous chloride pentahydrate was added. This solution was combined with 54.9 g HS-40, water added to make 100 g total weight, and the resulted gel thoroughly mixed. This mixture corresponded to a reaction ratio of $5Na_2O:SnO_2:10SiO_2:80H_2O$. Crystallization at 200° C. or 6 weeks followed by workup as above produced a layer phase as indicated by powder x-ray diffraction shown in Table 4 and FIG. 2.

TABLE 4

| X-Ray Diffraction Pattern For Phase L | |
|---|---|
| dÅ | I/Io |
| 11.12 ± 0.20 | 96 |
| 5.50 ± 0.15 | 15 |
| 5.15 ± 0.10 | 21 |
| 4.64 ± 0.10 | 39 |
| 4.20 ± 0.10 | 18 |
| 3.71 ± 0.08 | 83 |
| 3.03 ± 0.08 | 18 |
| 2.81 ± 0.05 | 27 |
| 2.76 ± 0.05 | 100 |
| 2.60 ± 0.05 | 27 |
| 2.11 ± 0.05 | 27 |
| 2.04 ± 0.05 | 14 |

EXAMPLE 5

Potassium Stannosilicate (phase G). A 22.5 g quantity of potassium hydroxide was dissolved in 10.0 g of distilled water and added slowly to 25.9 g HS-40 (40% colloidal silica). A second solution was prepared from 20.0 g water and 15.1 g stannous chloride. The two solutions were combined to make a gel which was thoroughly mixed; water was added to make 100 g total weight. This corresponded to a reaction ratio of $2K_2O:SnO_2:4SiO_2:80H_2O$. The mixture was reacted at 175° C. for 7 days followed by workup as described above to give a crystalline phase with a distinctive diffraction pattern, as shown in Table 5 and FIG. 2.

TABLE 5

| X-Ray Diffraction Pattern For Phase G | |
|---|---|
| dÅ | I/Io |
| 8.05 ± 0.20 | 17 |
| 6.58 ± 0.15 | 59 |
| 5.86 ± 0.15 | 76 |
| 5.35 ± 0.15 | 8 |
| 5.06 ± 0.10 | 18 |
| 4.84 ± 0.10 | 7 |
| 4.37 ± 0.10 | 40 |
| 4.02 ± 0.10 | 13 |
| 3.59 ± 0.08 | 18 |
| 3.51 ± 0.08 | 16 |
| 3.27 ± 0.08 | 17 |
| 3.12 ± 0.08 | 8 |
| 3.05 ± 0.08 | 19 |
| 2.98 ± 0.05 | 100 |

TABLE 5-continued

| X-Ray Diffraction Pattern For Phase G | |
|---|---|
| dÅ | I/Io |
| 2.93 ± 0.05 | 38 |
| 2.86 ± 0.05 | 53 |
| 2.75 ± 0.05 | 12 |
| 2.67 ± 0.05 | 14 |
| 2.57 ± 0.05 | 10 |
| 2.50 ± 0.05 | 12 |
| 2.41 ± 0.05 | 9 |
| 2.14 ± 0.05 | 14 |
| 2.04 ± 0.05 | 12 |
| 1.93 ± 0.05 | 19 |
| 1.84 ± 0.05 | 10 |

EXAMPLE 6

Cesium Stannosilicate (phase K). A 71.6 g sample of 50% aqueous cesium hydroxide was added to 17.9 g HS-40 (40% colloidal silica); 10.5 g of stannous chloride was slowly added to this mixture and dissolved completely (no gel formed). This mixtures corresponded to a reaction ratio of $2Cs_2O:SnO_2:4SiO_2:95H_2O$. Crystallization at 200° C. for 3 weeks followed by workup as described above yielded a biphasic material as observed by powder x-ray diffraction, as shown in Table 6 and FIG. 2.

TABLE 6

| X-Ray Diffraction Pattern For Phase K | |
|---|---|
| dÅ | I/Io |
| 5.58 ± 0.15 | 14 |
| 5.20 ± 0.10 | 20 |
| 4.85 ± 0.10 | 21 |
| 4.44 ± 0.10 | 67 |
| 3.66 ± 0.08 | 39 |
| 3.56 ± 0.08 | 99 |
| 3.36 ± 0.08 | 56 |
| 3.14 ± 0.08 | 12 |
| 3.07 ± 0.08 | 66 |
| 3.00 ± 0.08 | 100 |
| 2.92 ± 0.05 | 51 |
| 2.84 ± 0.05 | 9 |
| 2.60 ± 0.05 | 23 |
| 2.56 ± 0.05 | 39 |
| 2.48 ± 0.05 | 23 |
| 2.41 ± 0.05 | 23 |
| 2.24 ± 0.05 | 17 |
| 2.10 ± 0.05 | 19 |
| 1.96 ± 0.05 | 14 |
| 1.83 ± 0.05 | 22 |
| 1.83 ± 0.05 | 18 |

Figure 3A:
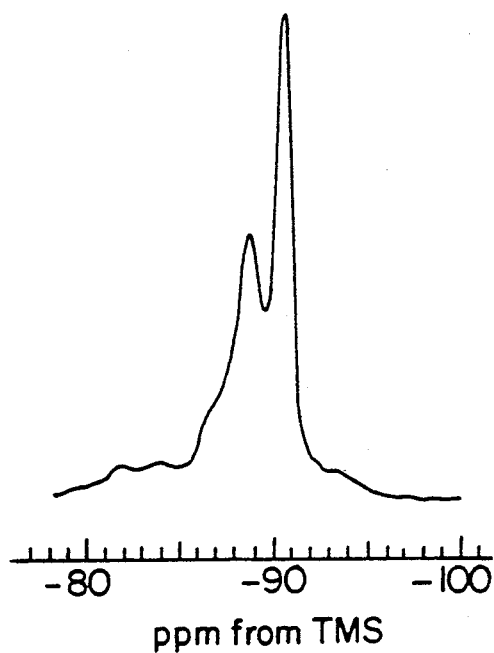
FIG. 3 is an example of MASNMR spectra for Phase A showing tetrahedral silicon ($^{29}Si$-NMR) FIG. 3(a) and octahedral tin ($^{119}Sn$-NMR) FIG. 3(b) (for 29Si-NMR references see Engelhardt and Michels, "High resolution solid state NMR of silicates and zeolites", J. Wiley (London), (1987); and for $^{119}Sn$-NMR references Clayden et al (J. Chem. Soc. Dalton, p. 843 (1989 and Grey et al, J. Amer. Chem. Soc., 111, p. 505 (1989)). Further data are given in Table 2.
Figure 3B:
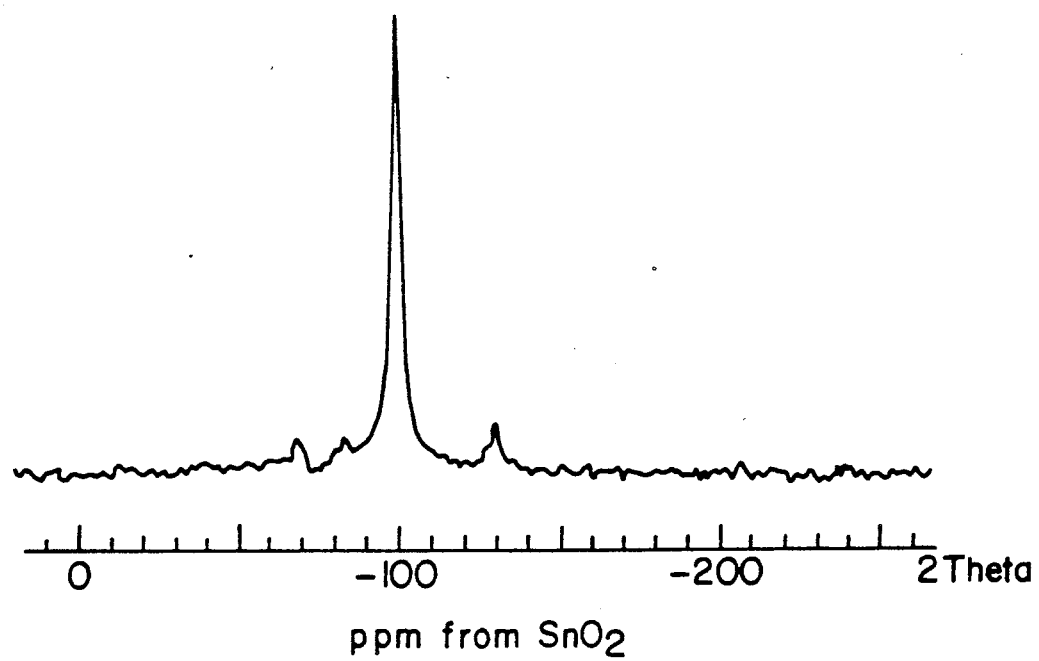

The alkali-metal:tin:silica reaction system was found to yield a new class of crystalline, microporous materials containing only tin, silicon, and oxygen as framework species. The phases generated in this system are new structure types, display reversible water loss, and are capable of ion exchange. $^{29}Si$-MASNMR clearly shows Si to be in tetrahedral sites and $^{119}Sn$-MASNMR that Sn is in octahedral sites, as shown in FIG. 3.

The novel stannosilicates of this invention have a variety of uses, e.g., because the alkali metal can be exchanged as in a zeolite material, nuclear waste clean up can be effected when M in the generic formula is radioactive cesium or strontium.

A particular utility for the material is as a hydrogen sulfide sorbent. Catalytic reforming reactions, for example, processes utilizing a supported nobel metal (e.g., platinum) catalyst to upgrade the octane level of naphtha, produce hydrogen which can be recycled to the reaction zone. Because naphtha feeds generally contain low sulfur levels which can build up during recycle processes and cause catalyst deterioration, the recycle hydrogen stream containing some hydrogen sulfide is passed through a sorbent to reduce the sulfide level of the recycle hydrogen. This prevents poisoning of the catalytic metal site by the sulfur compounds.

The sorbent process can be conducted at reforming pressures, e.g., 125 psig to about 600 psig, to avoid recompression of the hydrogen and at temperatures ranging from about 50° C. to 500° C. Hydrogen flow rates or space velocities, that is, volume of feed per hour per volume of sorbent, are easily determined based on the desired level of hydrogen sulfide removal, usually in excess of about 80%, preferably in excess of about 90%. SImilar sorpiton processes are used to remove $H_2S$ from various hydrocarbon streams containing $H_2S$ such as sour natural gas streams, and streams resulting from petrochemical refining operations.

The following example shows the ability of a form of the stannosilicate material to remove hydrogen sulfide from hydrogen streams and, more importantly, the regenerability of the stannosilicate so that it can be used and reused in multicycle fashion. In catalytic reforming operations, it is normal to have two or more beds of hydrogen sulfide sorbent so that the sulfide can be continuously adsorbed in one bed or another while the bed that is off stream is being regenerated. Such processes will be rather obvious to those skilled in the art.

Regeneration of the stannosilicate is readily effected by passing a small amount of hydrogen through the sorbent stannosilicate for several hours, e.g., one hour to 24 hours, while maintaining a positive pressure and at higher temperature than the adsorbing cycle but within the same general temperature range.

EXAMPLE 7

A stannosilicate prepared in accordance with Example 1 above was then exchanged with $NH_4+$ and loaded into a thermogravimetric analyzer and heated overnight at 650° F. in flowing hydrogen. 10.5% volatile matter, corresponding to 9.45 mg of the original 90.01 mg charge was lost. The results of several adsorption/desorption cycles are shown in Table 7 and demonstrate the ability of these novel, highly crystalline materials to separate $H_2S$ from $H_2S$ containing streams.

TABLE 7

$H_2S$ Sorption Data For Phase A

|  |  | Temp. | Time | Wt. Gain (Loss) |
|---|---|---|---|---|
| Cycle I |  |  |  |  |
| sorb | 10% $H_2S/H_2$ | 66° C. | 6.5 hours | 5.05 mg |
| desorb | $H_2$ | 316° C. | overnight | (4.80) |
| Cycle II |  |  |  |  |
| sorb | 0.2% $H_2S/H_2$ | 66° C. | 3.35 hours | .60 mg |
| desorb | $H_2$ | 316° C. | overnight | (.55) |
| Cycle III |  |  |  |  |
| sorb | 0.2% $H_2S/H_2$ | 66° C. | 2.35 hours | .36 mg |
| desorb | $H_2$ | 316° C. | overnight | (.37) |
| Cycle IV |  |  |  |  |
| sorb | 0.2% $H_2S/H_2$ | 66° C. | 6.67 hours | .67 mg |
| desorb | $H_2$ | 316° C. | overnight | (.67) |
| Cycle V |  |  |  |  |
| sorb | 0.2% $H_2S/H_2$ | 66° C. | 6.67 hours | 0.86 mg |
| desorb | $H_2$ | — | — | — |

Table 8, below, shows a variety of stannosilicate compositions which are in accordance with this invention, items noted with an asterisk resulted either in an amorphous structure or a quartz structure and are not part of this invention. In Table 8, sl is slight, TEA is triethanolamine and Examples 1–5 are as noted.

While the preparations shown in Table 8 are similar to the previous examples, in some instances the mixture was cold aged for a short period to promote nucleation and then held at reaction temperature for the requisite time period. In another instance a small amount of $Al_2O_3$ was added for the same purpose.

TABLE 8

| M | $M_2O$: | $SnO_2$: | $SiO_2$: | $H_2O$ | Reactant source and additional comments | Days | Temp. °C. | Phase |
|---|---|---|---|---|---|---|---|---|
| Na (ex 1) | 2 | 1 | 4 | 80 | colloidal silica, $SnCl_4.5H_2O$ | 21 | 200 | A (some L) |
| Na (ex 2) | 2 | 1 | 4 | 80 | fumed silica, $SnCl_4.5H_2O$ | 21 | 200 | B, A, L |
| Na | 2 | 1 | 4 | 80 | $Na_2SnO_3$, colloidal silica | 21 | 200 | A (good) |
| Na | 2 | 1 | 4 | 80 | colloidal silica, $SnCl_4.5H_2O$, cold age | 21 | 200 | B (some L) |
| Na | 2 | 1 | 4 | 80 | colloidal silica, $SnCl_4.5H_2O$, agitation | 21 | 180 | B (some L init.) |
| Na | 2 | 1 | 4 | 80 | colloidal silica, $SnCl_4.5H_2O$, sl. $Al_2O_3$ or seeds | 7–28 | 200 | B |
| Na | 2 | 1 | 4 | 80 | colloidal silica, $SnCl_4.5H_2O$, TEA | 21 | 180–200 | A (some L) |
| Na | 2 | 1 | 4 | 80 | "N", $SnCl_4.5H_2O$ | 21 | 200 | L and A |
| Na | 2 | 1 | 4 | 80 | "N", $SnCl_4.5H_2O$, TEA | 14 | 200 | L |
| Na | 2 | 1 | 4 | 80 | "N", $SnCl_4.5H_2O$, TEA | 14 | 180 | L (some B) |
| Na* | 4–8 | 1 | 4 | 80 | "N", $SnCl_4.5H_2O$ | 14 | 150 | amorphous |
| Na* | 2 | 1 | 6 | 80 | colloidal silica, $SnCl_4.5H_2O$ | 21 | 200 | amorphous |
| Na | 2.2 | 1 | 4 | 80 | "N", $Na_2SnO_3$ | 21 | 150 | L |
| Na | 2.2 | 1 | 4 | 80 | "N", $Na_2SnO_3$ | 21 | 200 | A (some L) |
| Na | 3 | 1 | 6 | 80 | "N", $Na_2SnO_3$ | 25 | 200 | L |
| Na | 6 | 1 | 4 | 80 | "N", $Na_2SnO_3$ | 28 | 150 | L |
| Na (ex 3) | 5 | 1 | 10 | 80 | colloidal silica, $SnCl_4.5H_2O$ | 14–60 | 150–200 | L (good) |
| Na* | 2–5 | 1 | 20 | 110–125 | colloidal silica, $SnCl_4.5H_2O$ | 30 | 200 | quartz |
| Na | 4 | 1 | 4 | 80 | colloidal silica, $SnCl_4.5H_2O$ | 30 | 200 | L |
| 1:1 Na:Li (ex 2) | 2 | 1 | 4 | 80 | colloidal silica, $SnCl_4.5H_2O$ | 30 | 150–200 | B (good) |
| 1:1 Na:K | 2 | 1 | 4 | 80 | colloidal silica, $SnCl_4.5H_2O$ | 7 | 150 | A |
| 1:1 Na:K | 2 | 1 | 4 | 80 | colloidal silica, $SnCl_4.5H_2O$ | 7 | 200 | A and L |
| K (ex 4) | 2 | 1 | 4 | 80 | colloidal silica, $SnCl_4.5H_2O$ | 5–30 | 150–200 | G |
| K | 5 | 1 | 10 | 80 | colloidal silica, $SnCl_4.5H_2O$ | 3–30 | 150–200 | G |
| Cs (ex 5) | 2 | 1 | 4 | 95 | colloidal silica, $SnCl_4.5H_2O$ | 30 | 200 | K |
| Cs | 5 | 1 | 10 | 180 | colloidal silica, $SnCl_4.5H_2O$ | 17–30 | 200 | O |
| Rb | 2 | 1 | 4 | 80 | colloidal silica, $SnCl_4.5H_2O$ | 17 | 200 | N |
| Li | 2 | 1 | 4 | 80 | colloidal silica, $SnCl_4.5H_2O$ | 60 | 200 | M |

Novel stannosilicate phases were prepared having structures comprised of corner sharing tin oxide octahedra and silicon oxide tetrahedra. These frameworks are generated hydrothermally from reaction gels containing base cations and a source of tin and silicon. The structure that results from a particular synthesis is highly dependent on the cation employed in the reaction. Cation mixtures were employed in several syntheses to generate new phases or to improve the purity of phases produced by single-cation systems.

TABLE 9

STANNOSILICATES - NMR DATA

|  | $^{29}$Si (ppm from TMS) | $^{119}$Sn (ppm from SnO$_2$) |
|---|---|---|
| Phase A | −88.5, −90.3 (4:7) | −102 |
| Phase B | −89.2 | −104 |
| Phase L | −82.6, −87.2 (4:7) | −93 |
| Phase G | −90.8, −92.0 (6:5) | −107 |
| Phase K | −86.9, −88.1 (6:5) | −138, −176 (5:2) |

EXAMPLE 8

A 3.89 g quantity of lithium hydroxide monohydrate was added to a mixture of 11.31 g of sodium hydroxide in 20.0 g of distilled water. This solution was added slowly, with mixing, to 27.84 g of HS-40 (40% colloidal silica in water). A second solution was prepared from the dissolution of 16.25 g of tin (IV) chloride pentahydrate in 20.0 g of distilled water. The two solutions were combined slowly, thoroughly mixed to form a homogeneous gel, and distilled water added to make a total weight of 100.0 g. This corresponded to a reaction ratio of Na$_2$O:Li$_2$O:SnO$_2$:4SiO$_2$:80H$_2$O. Part of this gel was sealed in a 75 ml stainless steel autoclave and reacted at 200° C. for 3 weeks. At the end of this period the reaction vessel was quenched and the resulting white solid removed by filtration. It was then washed repeatedly with water and dried overnight at 100° C. The material exhibited a characteristic powder x-ray diffraction pattern (Table 10) for phase B.

EXAMPLE 9

A 10.16 g quantity of sodium hydroxide was dissolved in 10.0 g of distilled water and mixed with a 50% aqueous solution of cesium hydroxide. This solution was added slowly, with mixing, to 24.93 g of HS-40. A second solution was prepared from the dissolution of 14.55 g of tin (IV) chloride pentahydrate in 15.0 g of distilled water. The two solutions were combined slowly, thoroughly mixed to form a homogeneous gel, and distilled water added to make a total weight of 100.0 g. This corresponded to a reaction ratio of Na$_2$O:Cs$_2$O:SnO$_2$:4SiO$_2$:80H$_2$O. Part of this gel was sealed in a 75 ml stainless steel autoclave and reacted at 200° C. for three weeks. At the end of this period the reaction vessel was quenched and the resulting white solid removed by filtration. It was then washed repeadedly with water and dried overnight at 100° C. The material exhibited a characteristic powder x-ray diffraction pattern (Table 11) for phase K.

TABLE 10

| 2 theta | d$_{obsv}$ | I/Io |
|---|---|---|
| 5.577 | 15.8337 | 2.0 |
| 12.202 | 7.2472 | 5.5 |
| 13.254 | 6.6744 | 1.6 |
| 14.107 | 6.2728 | 72.1 |
| 15.802 | 5.6036 | 74.8 |
| 18.794 | 4.7175 | 10.7 |

TABLE 10-continued

| 2 theta | d$_{obsv}$ | I/Io |
|---|---|---|
| 20.061 | 4.4223 | 19.3 |
| 21.286 | 4.1706 | 2.4 |
| 23.584 | 3.7692 | 7.2 |
| 24.656 | 3.6076 | 8.5 |
| 25.681 | 3.4659 | 2.3 |
| 26.689 | 3.3373 | 44.4 |
| 28.568 | 3.1219 | 3.4 |
| 29.466 | 3.0288 | 100.0 |
| 31.203 | 2.8640 | 2.8 |
| 32.040 | 2.7910 | 7.3 |
| 32.872 | 2.7223 | 41.3 |
| 35.197 | 2.5476 | 6.5 |
| 36.701 | 2.4466 | 18.4 |
| 37.440 | 2.4000 | 5.2 |
| 38.484 | 2.3373 | 7.5 |
| 39.536 | 2.2774 | 5.4 |
| 41.558 | 2.1712 | 5.8 |
| 43.507 | 2.0783 | 1.4 |
| 44.128 | 2.0505 | 18.1 |
| 44.769 | 2.0226 | 2.1 |
| 46.011 | 1.9709 | 1.6 |
| 46.606 | 1.9471 | 14.5 |
| 47.205 | 1.9238 | 17.0 |
| 48.969 | 1.8585 | 3.7 |
| 49.562 | 1.8377 | 8.8 |

TABLE 11

| 2 theta | d$_{obsv}$ | I/Io |
|---|---|---|
| 8.006 | 11.0335 | 4.2 |
| 12.129 | 7.2905 | 22.7 |
| 14.027 | 6.3080 | 42.8 |
| 15.724 | 5.6311 | 4.6 |
| 17.233 | 5.1412 | 30.7 |
| 19.936 | 4.4498 | 41.0 |
| 23.431 | 3.7933 | 33.7 |
| 24.431 | 3.6404 | 8.2 |
| 25.160 | 3.5365 | 6.2 |
| 25.509 | 3.4889 | 29.6 |
| 26.498 | 3.3609 | 100.0 |
| 28.367 | 3.1435 | 4.9 |
| 29.262 | 3.0494 | 75.0 |
| 29.963 | 2.9797 | 21.6 |
| 30.722 | 2.9077 | 8.4 |
| 30.988 | 2.8833 | 6.6 |
| 31.806 | 2.8111 | 35.4 |
| 32.618 | 2.7429 | 79.0 |
| 33.417 | 2.6792 | 14.6 |
| 34.539 | 2.5946 | 5.0 |
| 34.948 | 2.5652 | 3.2 |
| 35.325 | 2.5387 | 3.5 |
| 36.420 | 2.4648 | 17.4 |
| 36.650 | 2.4499 | 1.5 |
| 37.155 | 2.4177 | 3.0 |
| 38.546 | 2.3336 | 18.6 |
| 40.575 | 2.2215 | 12.1 |
| 41.262 | 2.1861 | 6.0 |
| 42.538 | 2.1234 | 13.1 |
| 43.788 | 2.0656 | 36.7 |
| 44.412 | 2.0381 | 15.0 |
| 46.223 | 1.9623 | 14.0 |
| 46.817 | 1.9388 | 14.5 |
| 47.402 | 1.9163 | 7.8 |
| 48.578 | 1.8726 | 8.6 |
| 49.166 | 1.8515 | 8.2 |

From these experiments, the use of multication synthesis gels offers significant improvements in product purity and yield. These gels are best described as having compositions in the range:

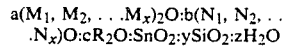

a(M$_1$, M$_2$, . . . M$_x$)$_2$O:b(N$_1$, N$_2$, . . . N$_x$)O:cR$_2$O:SnO$_2$:ySiO$_2$:zH$_2$O where M represents an alkali metal from Group IA of the Periodic Table, N represents an alkaline earth element of Group 2A of the Periodic Table, and R represents an alkyl ammonium compound(s) or amine(s). The improvements result from using more than one element or compound from the groups represented as M, N, or R.

EXAMPLE 10

In a procedure similar to Example 7, several of the novel stannosilicates were tested as sorption agents for hydrogensulfide. The results are shown in Table 12 and the values refer to weight gain/loss in sorb/desorb cycles. While all of the phases tested show H₂S sorption activity, phase G shows the best activity. Thus, phase G and the NH₄ exchanged phase A are most preferred for sorbent activity, particularly phase G.

TABLE 12

| Cycle | | K | B | G | A | Commercial Sorbent |
|---|---|---|---|---|---|---|
| 1 | Sorb | 0.90 (0.96%) | 0.83 (0.90%) | 4.19 (4.59%) | 0.70 (0.71%) | 4.60 (4.63%) |
|   | Desorb | 0.70 | 1.70 | 3.46 | 0.65 | 3.00 |
| 2 | Sorb | 0.33 (0.35%) | 1.03 (1.12%) | 3.33 (3.65%) | 0.07 (0.07%) | 3.85 (3.88%) |
|   | Desorb | 0.24 | 1.10 | 3.45 | 0.12 | 3.40 |
| 3 | Sorb | 0.52 (0.55%) | 1.06 (1.15%) | 3.47 (3.80%) | 0.11 (0.11%) | 2.15 (2.17%) |
|   | Desorb | 0.37 | 1.30 | 3.42 | 0.28 | 1.00 |
| 4 | Sorb | 0.47 (0.50%) | 0.92 (1.00%) | 3.34 (3.66%) | 0.23 (0.23%) | 1.40 (1.40%) |
|   | Desorb | 0.56 | 0.86 | 3.36 | 0.19 | 1.90 |
| 5 | Sorb | 0.25 (0.27%) | 0.99 (0.70%) | 3.37 (3.69%) | 0.15 (0.15%) | 2.05 (2.06%) |
|   | Desorb | 0.25 | 1.08 | 3.29 | 0.15 | 1.75 |
| 6 | Sorb | 0.17 (0.18%) | 0.64 (0.70%) | 3.36 (3.68%) | 0.19 (0.19%) | 1.90 (1.91%) |
|   | Desorb | 0.21 | 0.62 | — | 0.12 | 1.70 |
| 7 | Sorb | 0.15 (0.16%) | 0.98 (1.07%) | — | — | 1.90 (1.91%) |
|   | Desorb | — | — | — | — | 1.80 |

What is claimed is:

1. Crystalline stannosilicate of the formula

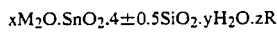

$$xM_2O \cdot SnO_2 \cdot 4 \pm 0.5SiO_2 \cdot yH_2O \cdot zR$$

wherein M is Group IA metal, a Group IIA metal, whereupon M₂O becomes MO, or a quaternary amine;
x is 1.5 to 4;
y is 4 to 15;
R is an amine; and
z is 0 to 4
wherein the framework species comprises tin in octahedral coordination, silicon in tetrahedral coordination, and oxygen.

2. The composition of claim 1 having the x-ray diffraction pattern of phase A as shown in Table 1, below:

TABLE 1

| dÅ | I/Io |
|---|---|
| 6.33 ± 0.15 | 20 |
| 5.83 ± 0.15 | 100 |
| 5.56 ± 01.5 | 42 |
| 5.19 ± 0.10 | 12 |
| 4.73 ± 0.10 | 8 |
| 4.28 ± 0.10 | 18 |
| 3.30 ± 0.08 | 23 |
| 3.05 ± 0.08 | 73 |
| 2.91 ± 0.05 | 69 |
| 2.77 ± 0.05 | 27 |
| 2.64 ± 0.05 | 11 |
| 2.45 ± 0.05 | 15 |
| 2.35 ± 0.05 | 9. |

3. The composition of claim 1 having the x-ray diffraction pattern of phase B as shown in Table 3, below:

TABLE 3

| dÅ | I/Io |
|---|---|
| 6.25 ± 0.15 | 74 |
| 5.59 ± 0.15 | 70 |
| 4.41 ± 0.10 | 22 |
| 3.76 ± 0.08 | 13 |
| 3.60 ± 0.08 | 8 |
| 3.33 ± 0.08 | 26 |
| 3.11 ± 0.08 | 6 |
| 3.02 ± 0.08 | 100 |
| 2.72 ± 0.05 | 40 |
| 2.54 ± 0.05 | 10 |
| 2.44 ± 0.05 | 19 |
| 2.40 ± 0.05 | 5 |
| 2.28 ± 0.05 | 6 |
| 2.17 ± 0.05 | 8 |
| 2.05 ± 0.05 | 21 |
| 1.95 ± 0.05 | 19 |
| 1.90 ± 0.05 | 7 |
| 1.84 ± 0.05 | 12. |

4. The composition of claim 1 having the x-ray diffraction pattern of phase L as shown in Table 4, below:

TABLE 4

| dÅ | I/Io |
|---|---|
| 11.12 ± 0.20 | 96 |
| 5.50 ± 0.15 | 15 |
| 5.15 ± 0.10 | 21 |
| 4.64 ± 0.10 | 39 |
| 4.20 ± 0.10 | 18 |
| 3.71 ± 0.08 | 83 |
| 3.03 ± 0.08 | 18 |
| 2.81 ± 0.05 | 27 |
| 2.76 ± 0.05 | 100 |
| 2.60 ± 0.05 | 27 |
| 2.11 ± 0.05 | 27 |
| 2.04 ± 0.05 | 14. |

5. The composition of claim 1 having the x-ray diffraction pattern of phase G as shown in Table 5, below:

TABLE 5

| dÅ | I/Io |
|---|---|
| 8.05 ± 0.20 | 17 |
| 6.58 ± 0.15 | 59 |
| 5.86 ± 0.15 | 76 |
| 5.35 ± 0.15 | 8 |
| 5.06 ± 0.10 | 18 |
| 4.84 ± 0.10 | 7 |
| 4.37 ± 0.10 | 40 |
| 4.02 ± 0.10 | 13 |
| 3.59 ± 0.08 | 18 |
| 3.51 ± 0.08 | 16 |
| 3.27 ± 0.08 | 17 |
| 3.12 ± 0.08 | 8 |

TABLE 5-continued

| dÅ | I/Io |
|---|---|
| 3.05 ± 0.08 | 19 |
| 2.98 ± 0.05 | 100 |
| 2.93 ± 0.05 | 38 |
| 2.86 ± 0.05 | 53 |
| 2.75 ± 0.05 | 12 |
| 2.67 ± 0.05 | 14 |
| 2.57 ± 0.05 | 10 |
| 2.50 ± 0.05 | 12 |
| 2.41 ± 0.05 | 9 |
| 2.14 ± 0.05 | 14 |
| 2.04 ± 0.05 | 12 |
| 1.93 ± 0.05 | 19 |
| 1.84 ± 0.05 | 10. |

6. The composition of claim 1 having the x-ray diffraction pattern of phase K as shown in Table 6, below:

TABLE 6

| dÅ | I/Io |
|---|---|
| 5.58 ± 0.15 | 14 |
| 5.20 ± 0.10 | 20 |
| 4.85 ± 0.10 | 21 |
| 4.44 ± 0.10 | 67 |
| 3.66 ± 0.08 | 39 |
| 3.56 ± 0.08 | 99 |
| 3.36 ± 0.08 | 56 |
| 3.14 ± 0.08 | 12 |
| 3.07 ± 0.08 | 66 |
| 3.00 ± 0.08 | 100 |
| 2.92 ± 0.05 | 51 |
| 2.84 ± 0.05 | 9 |
| 2.60 ± 0.05 | 23 |
| 2.56 ± 0.05 | 39 |
| 2.48 ± 0.05 | 23 |
| 2.41 ± 0.05 | 23 |
| 2.24 ± 0.05 | 17 |
| 2.10 ± 0.05 | 19 |
| 1.96 ± 0.05 | 14 |
| 1.83 ± 0.05 | 22 |
| 1.83 ± 0.05 | 18. |

7. The composition of claim 1 having the x-ray diffraction pattern of phase X as shown in Table 2, below:

TABLE 2

| dÅ | I/Io |
|---|---|
| 5.50 ± 0.10 | 100 |
| 4.93 ± 0.10 | 44 |
| 4.09 ± 0.10 | 5 |
| 3.67 ± 0.08 | 5 |
| 3.43 ± 0.08 | 27 |
| 3.31 ± 0.08 | 11 |
| 2.94 ± 0.05 | 47 |
| 2.84 ± 0.05 | 24 |
| 2.75 ± 0.05 | 24 |
| 2.46 ± 0.05 | 10 |
| 2.40 ± 0.05 | 15 |
| 2.25 ± 0.05 | 11 |
| 2.19 ± 0.05 | 7 |
| 2.15 ± 0.05 | 17 |
| 2.04 ± 0.05 | 6 |
| 1.97 ± 0.05 | 12 |
| 1.86 ± 0.05 | 9 |
| 1.83 ± 0.05 | 7. |

8. A process for preparing crystalline stannosilicates wherein the framework comprises tin in octahedral coordination, silicon in tetrahedral coordination, and oxygen which comprises reacting a water soluble tin salt, a source of silica, the tin:silicon mole ratio being no greater than 1:20, and a Group IA or group IIA metal hydroxide or mixtures thereof or amine in an aqueous medium and recovering the crystalline stannosilicate.

9. The process of claim 8 wherein the ratio of tin:silicon is about 1:4 to 1:20.

10. The process of claim 8, wherein the reaction mixture is aged at ambient conditions for a period sufficient to initiate nucleation.

11. The process of claim 10 wherein the aging at ambient conditions is for at least about 3 hours.

12. The process of claim 8, wherein a nucleating compound is added to the reaction mixture in sufficient amount to initiate nucleation.

13. The process of claim 12 wherein the amount of nucleating compound is less than about 10 vol %.

14. The process of claim 8 wherein the reaction temperature ranges from about 90° C. to about 250° C.

15. The process of claim 8 wherein the crystalline stannosilicate is treated with an acid.

16. The process of claim 8 wherein the crystalline stannosilicate is dried to remove substantially all the water contained therein.

17. The process of claim 14 wherein the reaction temperature ranges from about 150°-225° C.

* * * * *